United States Patent [19]
Potu

[11] Patent Number: 5,977,947
[45] Date of Patent: Nov. 2, 1999

[54] METHOD AND APPARATUS FOR RESIZING BLOCK ORDERED VIDEO IMAGE FRAMES WITH REDUCED ON-CHIP CACHE

[75] Inventor: Brahmaji Potu, Austin, Tex.

[73] Assignee: International Business Machines Corp., Armonk, N.Y.

[21] Appl. No.: 08/699,264

[22] Filed: Aug. 19, 1996

[51] Int. Cl.[6] .............................. G09G 5/00; H04N 13/00
[52] U.S. Cl. ..................... 345/127; 345/132; 345/131; 348/42; 382/197
[58] Field of Search ................................ 345/127, 132, 345/196, 517, 202, 131; 382/159, 197; 348/42–51

[56] References Cited

U.S. PATENT DOCUMENTS

| | | | |
|---|---|---|---|
| 5,019,903 | 5/1991 | Dougall et al. | 358/140 |
| 5,355,328 | 10/1994 | Arbeiter et al. | 364/724.1 |
| 5,406,306 | 4/1995 | Siann et al. | 345/115 |
| 5,410,616 | 4/1995 | Kidd | 382/47 |
| 5,438,654 | 8/1995 | Drebin et al. | 395/139 |
| 5,469,222 | 11/1995 | Sprague | 348/580 |
| 5,475,437 | 12/1995 | Song | 348/448 |
| 5,657,047 | 8/1997 | Tarolli | 345/127 |
| 5,784,047 | 7/1998 | Cahill, III et al. | 345/127 |

*Primary Examiner*—Richard A. Hjerpe
*Assistant Examiner*—Henry N. Tran
*Attorney, Agent, or Firm*—Volel Emile

[57] ABSTRACT

The present invention provides a method and apparatus for resizing a video image. In a preferred embodiment of the invention, an adapter having a bilinear filter is provided. The bilinear filter contains two first-in first-out (FIFO) memory devices for storing the video image and a vertical and horizontal filters for vertically and horizontally resizing the image. To resize the image, the video data representing the image is transferred to the graphics adapter in M×M arrays of pixel data. Each one of the (FIFO) memory devices has the capacity of storing one row of pixel data at a time. Adjacent rows are stored in the FIFO devices for vertical interpolation by the vertical filter. The oldest row in the FIFO devices is replaced by a new row for further interpolation. As each row is transferred to the horizontal filter, intermediate pixels are generated. In another embodiment, extra storage devices are used to hold data elements for interpolating between every two adjacent horizontal blocks.

15 Claims, 5 Drawing Sheets

METHOD AND APPARATUS FOR RESIZING BLOCK ORDERED VIDEO IMAGE FRAMES WITH REDUCED ON-CHIP CACHE

RELATED PATENT APPLICATIONS

Related patent applications include commonly assigned copending application U.S. Ser. No. 08/699,289 filed on the same date as the present application, entitled METHOD AND APPARATUS FOR BLOCK DATA TRANSFER TO REDUCE ON-CHIP STORAGE FOR INTERPOLATIVE VIDEO RESIZING (IBM Docket No. AT9-96-067) incorporated herein by reference.

BACKGROUND OF THE INVENTION

1. Field of the Invention

The present invention relates generally to computer graphics systems and more particularly to a display graphics adapter having a video accelerator with reduced on-chip storage requirements for interpolative video upscaling.

2. Description of the Related Art

Video resizing has become an essential feature in graphics and multi-media adapters for video monitoring and playback applications. Video resizing implies either upscaling or downscaling video frames of an image to a desired size. The video frames may come from either a real-time or a non real-time source. A real-time source includes a video camera or a VCR. A non real-time source includes a compact disk read-only-memory (CD-ROM), a hard disk storage or a network connected to a computer where the data is received in burst mode (i.e., video conferencing).

A video camera or VCR provides an uncompressed video signal that can be displayed on a TV monitor. If a National Television Standards Committee (NTSC) compliant video signal is decoded and digitized, it will have a square pixel resolution of 640×480 pixels/frame. The frame in the signal is constructed from two interlaced fields of 240 lines each. The fields are updated at 60 Hz to produce a smooth motion on the display. When the video signal is decoded to its components, it produces pixels in YUV color space which can be easily converted into RGB color space through a linear transformation.

A great amount of storage space is required to store a video signal after digitization. For example, 27 MBytes of storage are needed to store one second of RGB data of a digitized video signal. Therefore to save storage space, digitized signals are often compressed (usually by a factor of 10 to 50) before being stored on a CD-ROM or a hard disk storage. Often times, the video frames are scaled down before compression to further save storage space. The process of digitizing, downscaling, compressing and storing the video data is known as a capture operation. The reverse operation is called a playback operation.

Thus, a playback operation involves decompressing the video data, converting the data from YUV to RGB color space and scaling the decompressed image to the desired size (resizing) on the display screen. To perform the resizing operation, bilinear filtering is often used. Bilinear filtering is computationally intensive and is usually implemented in hardware as part of the graphics chip or as a separate video accelerator chip. The following linear interpolation algorithm is used in bilinear filtering:

$$O_1 = RF^* p_2 + (1-RF)^* p_1;$$

$$O_2 = 2RF^* p_2 + (1-2RF)^* p_1;$$

$$O_3 = 3RF^* p_2 + (1-3RF)^* p_1;$$

$$O_4 = 4RF \ldots$$

where the resize factor $$(RF) = \frac{(\text{sourcre image size} - 1)}{(\text{target image size} - 1)};$$

$p_1, p_2, \ldots$ are pixels of the original image; and $O_1, O_2, \ldots$ are pixels of the resized image. Bilinear filtering corresponds to performing linear interpolation in both horizontal and vertical directions.

Bilinear filtering may be used for upscaling as well as downscaling video images; although it is used mostly to upscale video images in playback operation. When bilinear filtering is used to upscale an image, RF is always less than one. When the values of RF multiples (e.g., 2RF, 3RF etc.) in the above equations becomes greater than one (e.g., 1.2), then only the fractional values are used (e.g., 0.2) in conjunction with the next pixel ($p_3$) and the current pixel ($p_2$) to generate the pixels in the resized image, the old pixel ($p_1$) is discarded.

FIG. 1 depicts a bilinear filter 100 used in the prior art to resize video images. The bilinear filter 100 contains a vertical filter 110 connected to a vertical memory 120. The vertical filter is also connected to a buffer 130 which is further connected to a horizontal filter 140. The vertical filter 110 is used to expand the image vertically. Similarly, the horizontal filter 140 is used to expand the image horizontally. The vertical memory 120 typically has a capacity to store at least one scan line of pixels (768×3 bytes). The buffer 130 need only have a two-pixel storage capacity; however, to decrease the time required to acquire each new pixel, the buffer is usually provided with a three-pixel storage capacity.

During a video playback, a frame of video image pixels is scanned line by line from top to bottom and input into the bilinear filter. As the first line of video image is scanned, it is stored into the vertical memory 120. When the next line is scanned in, the vertical filter generates the intermediate lines by interpolating between the two lines of pixels. The filter 110 then replaces the previously stored line of pixels in the vertical filter memory 120 with the current scan line for further interpolation. The first line, ordinarily referred to as an anchor line, and the last line as well as all vertically interpolated scan lines are passed on to the horizontal filter. The process continues until the whole frame is vertically expanded.

When the first line of pixels is scanned into the vertical filter 110, it is also transmitted to the buffer 130. As the pixels are transferred to buffer 130, the horizontal filter 140 interpolates between every two pixels stored in the buffer 130. This process is repeated for each line of pixels received from the vertical filter 110. Consequently, a resized or scaled up version of the input image is produced at the video output.

As stated above, the bilinear filter 100 uses a memory device having 768×3 bytes (or 768 pixels of 24 bits each) of storage capacity. This amount of storage requirement uses a great portion of the real state of the die of the video accelerator chip which directly affects the chip's overall cost.

Thus, there is a need in the art for a cost effective video accelerator chip that requires a minimal amount of storage capacity.

SUMMARY OF THE INVENTION

The need in the art is addressed by the present invention. The present invention provides a method and apparatus for resizing a video image. In a preferred embodiment of the invention, an adapter having a bilinear filter is provided. The bilinear filter contains two first-in first-out (FIFO) memory devices for storing the video image and vertical and horizontal filters for vertically and horizontally resizing the image. The image is resized as follows: video data representing the image is transferred to the graphics adapter in M×M arrays of pixel data. Each one of the (FIFO) memory devices has the capacity of storing one row of pixel data at a time. Adjacent rows of pixel data of an array are stored in a pair of FIFO devices for vertical interpolation by the vertical filter. After the interpolation between any two rows is completed, the row is transferred to the horizontal filter for horizontal interpolation.

In another embodiment, extra storage devices are used to hold pixel data elements for extrapolating or interpolating between two adjacent arrays.

DESCRIPTION OF THE INVENTION

Figure 2:
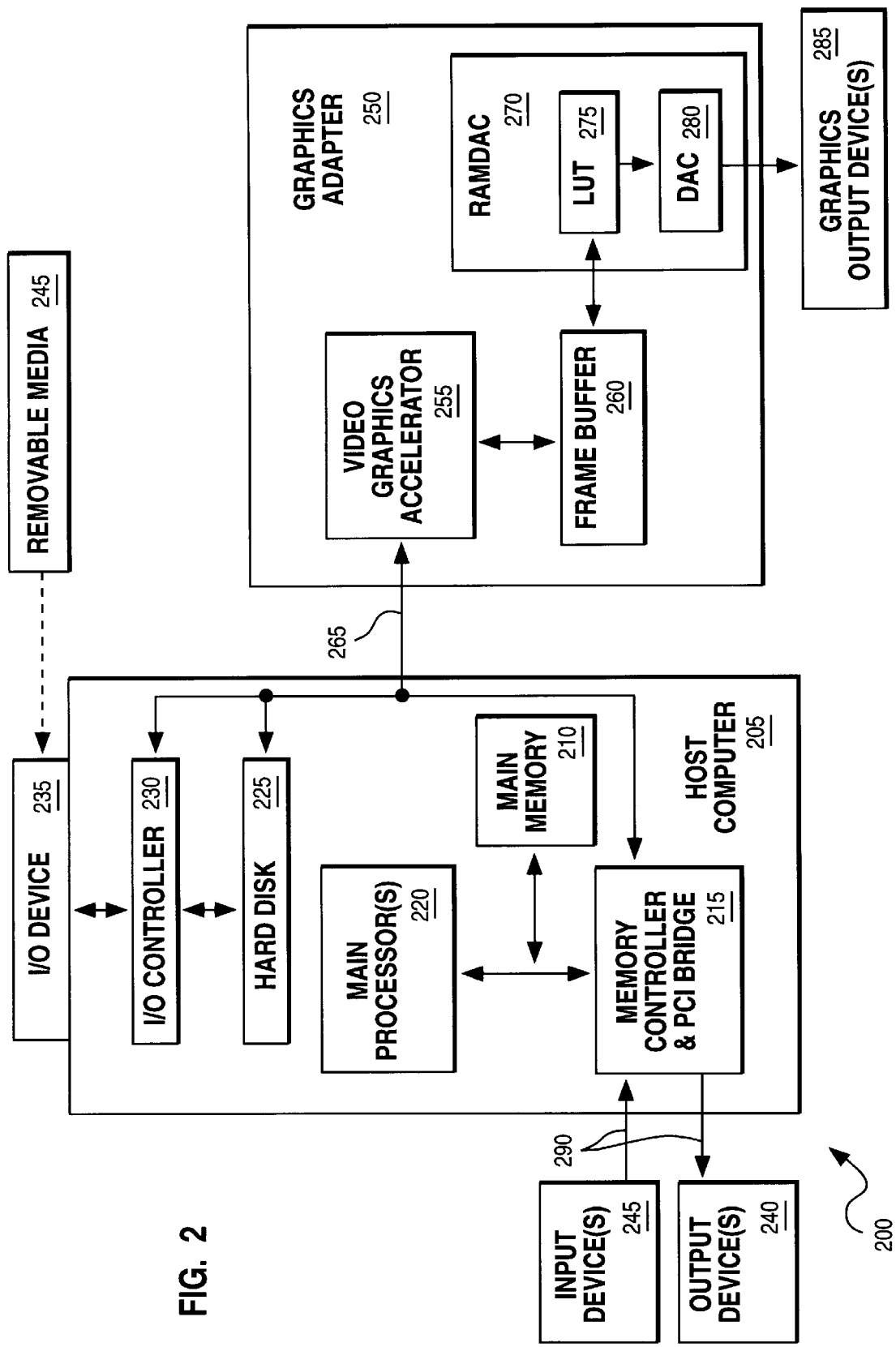
FIG. 2 is a block diagram of a digital computer utilized by a preferred embodiment of the invention.

FIG. 2 is a block diagram of a digital computer 200 utilized by a preferred embodiment of the invention. The computer includes main processor(s) 220 coupled to a memory 210 and a hard disk 225 in computer box 205. The main processor is coupled to input device(s) 245 and output device(s) 240 through a memory controller and PCI bridge 215. The memory controller and PCI bridge 215 interfaces 32-bit busses 290 which run at 33 MHz with a 64-bit bus 265 running at between 50 MHz and 66 MHz. Input device(s) 245 may include a keyboard, mouse, tablet or other types of input devices. Output device(s) 240 may include a text monitor, plotter or other types of output devices. Computer readable removable media 245, such as a magnetic diskette or a compact disc read-only-memory (CD-ROM) may be inserted into an input/output device 235, such as a disk drive or a CD-ROM drive. Data is read from or written to the removable media by the I/O device under the control of the I/O device controller 230. The I/O device controller communicates with the main processor through the 64-bit PCI bus 265. Main memory 210, hard disk 225 and removable media 245 are all referred to as memory for storing data for processing by main processor(s) 220.

The main processor(s) 220 is also coupled to graphics output device(s) 285 such as a graphics display through a graphics adapter 250. Graphics adapter 250 receives instructions regarding graphics from main processor(s) 210 on the 64-bit PCI bus 265. The graphics adapter then executes those instructions in video graphics accelerator chip 255 and updates frame buffer 260 based on those instructions. Frame buffer 260 includes data for every pixel to be displayed on the graphics output device. Random-access-memory and digital-to-analog converter (RAMDAC) 270 is coupled to frame buffer 260. RAMDAC 270 consists of look up table (LUT) 275 which contains a palette of colors to be referenced by the data in the frame buffer and a DAC (digital-to-analog converter) 280 to convert the digital data stored in the frame buffer into RGB signals to be provided to the graphics display 285 for display.

Figure 3:
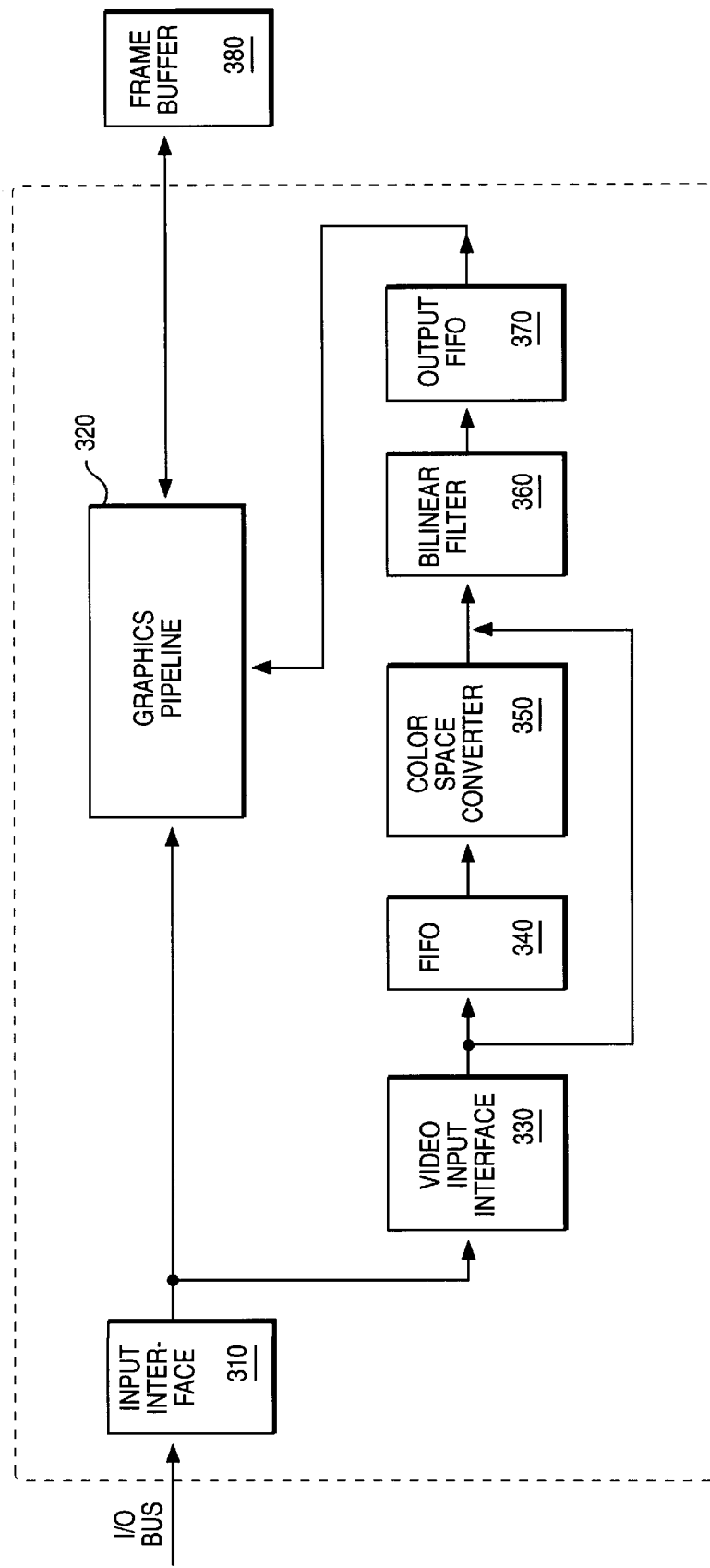
FIG. 3 is a block diagram of the graphics accelerator chip.

The invention is implemented in the graphics accelerator chip 255. FIG. 3 is a block diagram of the graphics accelerator chip 255. The graphics accelerator chip 255 comprises an input interface 310 coupled to a graphics pipeline 320 and a video input interface 330. The input interface 310 distributes graphics data either to the graphics pipeline 320 or to the video input interface 330. Video data, which often has to be resized or converted from YUV to RGB, is distributed to the video input interface 330 whereas graphics data is distributed directly to the graphics pipeline 320. The video input interface 330 is connected to both a first-in first-out (FIFO) 340 and a bilinear filter 360. If the input data is YUV pixel data, the video input interface 330 transfers the data to FIFO 340; if, however, the data is RGB pixel data, the video input interface 330 transfers the data directly to the bilinear filter 360. YUV data in the FIFO 340 is transferred to a color space converter 350 to be converted to RGB data before being forwarded to the bilinear filter 360. RGB data processed by the bilinear filter is transmitted to the graphics pipeline 320 through an output FIFO 370. The graphics pipeline 320 accelerates graphics operations such as line drawing, BLIT transfer etc. and stores the data in frame buffer 380 to be displayed on a display monitor. The implementation of a graphics pipeline is well known in the art and, thus, is not explained.

Figures 1, 4:
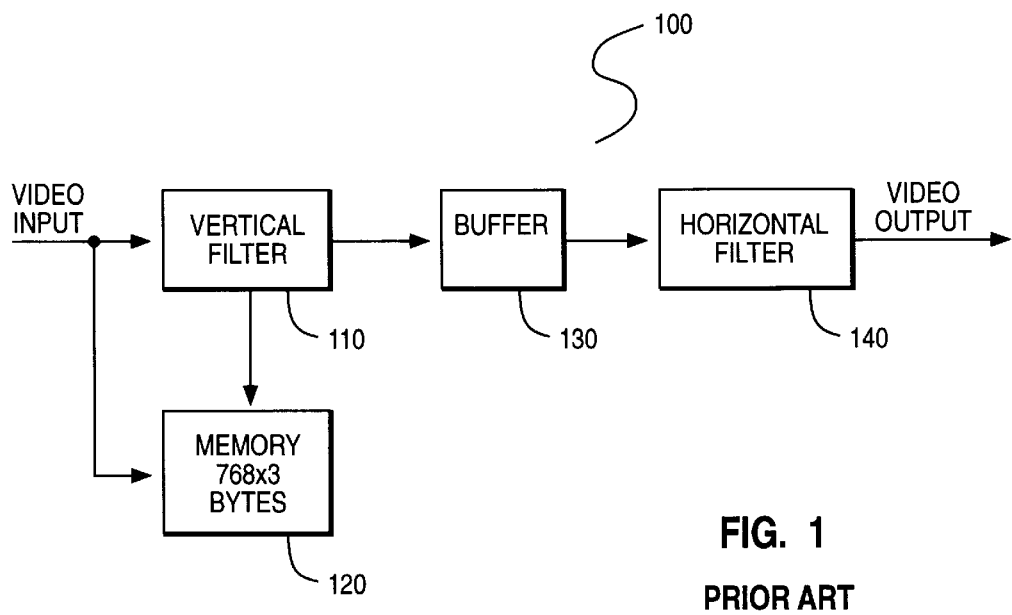
FIG. 1 depicts a block diagram of a bilinear filter used in the prior art for resizing video images.
FIG. 4 is an example of pixel blocks of data.
Figures 5, 7:
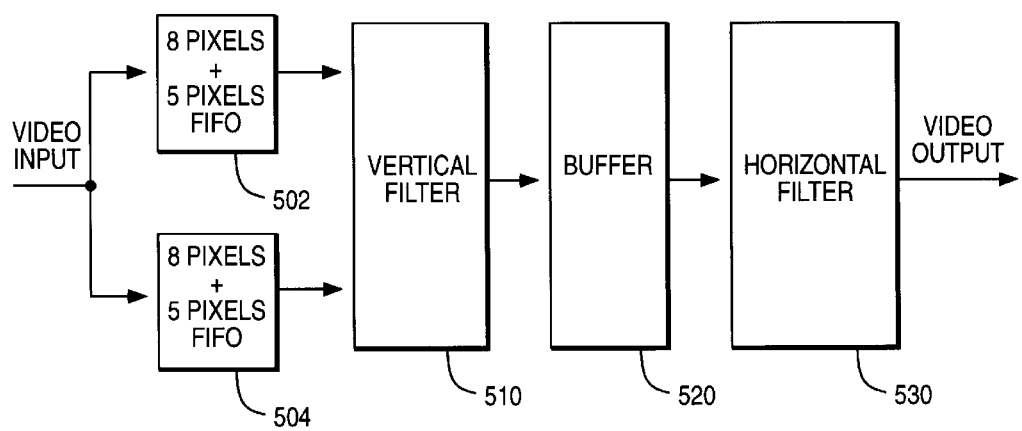
FIG. 5 illustrates the input format of the pixel blocks of a video image frame to a graphics adapter of the present invention.
FIG. 7 depicts a block diagram of a bilinear filter used in the present invention for resizing video images.

As stated earlier, the most predominant operation on multimedia computers today is the video playback operation. The first stage of the playback operation is to decompress the video file received from a storage device such as a hard disk, a CD-ROM or a network. This task is usually performed by the main processor(s) 220. The video data is typically compressed in accordance with one of the standard block-oriented compression algorithms such as the Joint Photographic Experts Group (JPEG), the Motion Pictures Experts Group (MPEG) I or II or Px64 for Video Conferencing, etc. The decompression of such data produces a block-oriented output in pixel component blocks or arrays. The pixel component blocks or arrays are then stored in the main memory 210 to be later transferred to the video accelerator 255 in the graphics adapter 250 as frames of pixel data. In the case of YUV 4:2:0 pixel data discussed further, the main processor(s) 210 will merge the pixel data to generate pixel blocks or arrays. After decompression and possibly merging, most video algorithms produce YUV 4:2:2 pixel data. FIG. 4 is an example of 8×8 pixel blocks in YUV 4:2:2 pixel format. The numbers 1, 2, 3 . . . indicate the order in which the blocks are generated and Roman numerals I, II designate the order in which strips are generated for a frame. YUV 4:2:2 and RGB pixel data are transferred to the video accelerator 255 in this fashion. The pixel blocks I1, I2, I3 etc. in FIG. 4 may be sent to the video accelerator 255 as they are being generated or after a complete video frame or strip is decompressed. The last column of pixels as well as the last row of pixels in each block are required for interblock filtering. The last column of pixels are normally retained in the video accelerator after vertical scaling of a block has occurred; however, the last segment of pixels of a block are not retained. Thus, the last row of each block has to be resent or rescanned into the video accelerator 255. FIG. 5 illustrates the input format of the pixel blocks of FIG. 4 into the video accelerator 255. The pixels that are to be resent are shown in a marked row between strips I and II. Hence, the following illustrates the order in which the video accelerator 255 receives data: strip I: block1, block2, . . . ; strip2: block1, . . . .

Before transferring the pixel data to the graphics accelerator 255, the main processor(s) 220 indicates the number of strips in a frame, the number of blocks in each frame and the size of the blocks. Using this information, the graphics accelerator 255 is able to process the data appropriately especially in the case where the last block is not a full block. For example, suppose the main processor(s) 220 is to send 10 lines of pixels and 21 columns of pixels and suppose the pixels are to be divided in 8×8 blocks, then two 16-bit messages will be sent to the graphics accelerator 255 which will be stored in two registers, an X and a Y register, within the video input interface 330. Using the example above, the X register would hold 0000000000010101 and the Y register 0000000000001010. The first thirteen digits of the message in the X register indicate the number of blocks containing eight columns of pixels (e.g., 0000000000010=2) and the last three digits indicate the number of columns of pixels in the last block (e.g., 101=5). The first thirteen digits in the Y register designate the number of strips in the frame having eight rows (e.g., 0000000000001=1) and the last three digits designate the number of lines of pixel data in the last strip (e.g., 010=2). The video input interface 330 attaches an end of scan (eos) tag to the last pixel of each row of an array. An end of block (eob) tag is also attached to the last pixel of each array. The last pixel of each strip and the last pixel of each frame are attached with an end of line (eol) and an end of frame (eof), respectively. Consequently, the last block and/or the last strip of each frame may be accurately processed.

Figure 6:
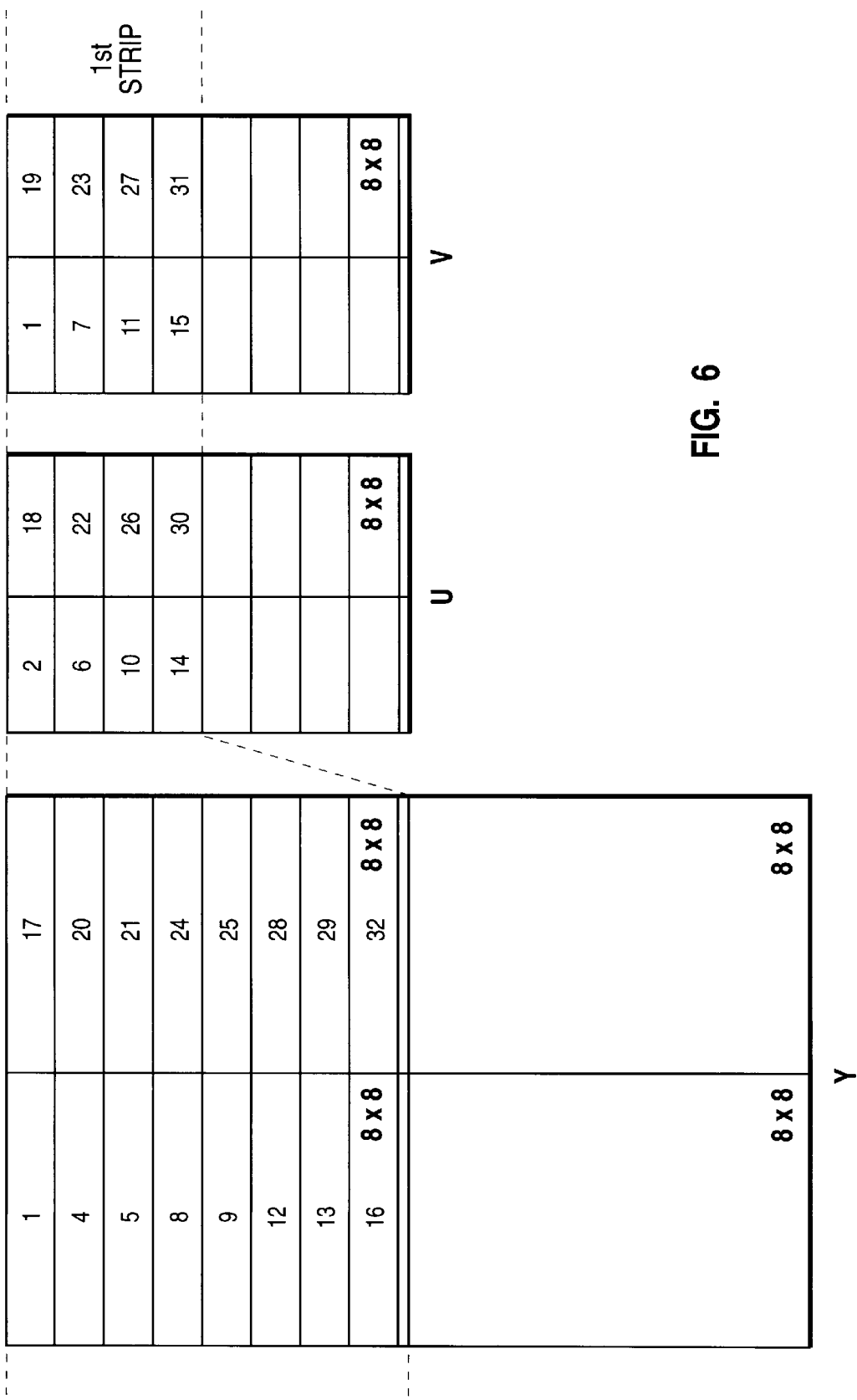
FIG. 6 illustrates the transfer order of the Y, U and V planar components of the MPEG macro block to arrive at the YUV 4:2:2 format.

When data compressed using MPEG I or II and Px64 are decompressed by a software video codec (coder-decoder), YUV 4:2:0 pixels in a planar format are produced. That is, a macro block consisting of separate Y, U and V component blocks is generated. FIG. 6 is an illustration of an MPEG macro block in YUV 4:2:0 pixel format. As shown in FIG. 6, the Y block is 16×16 bytes and the U and V blocks are each 8×8 bytes. As the blocks are produced, the main processor(s) 220 transfers the YUV 4:2:0 planar blocks to the video accelerator 255 in a predefined order. For example, eight bytes of Y, four bytes of U, four bytes of V and eight bytes of Y, are transferred; then, eight bytes of Y, four bytes of U, four bytes of V and eight bytes of Y are again transferred. The process continues until the whole video image frame is transferred to the video accelerator 255. The video accelerator 255 assembles the data into YUV 4:2:2 format (e.g., see FIG. 4) as it is being received. The order of the byte transfers is illustrated in FIG. 6 with numbers 1, 2, 3, 4, etc. indicating the order in which the Y, U and V line segments are transferred. Just as in the YUV 4:2:2 block transfer, interblock segment components have to be retransferred. Accordingly, line segments 13, 14, 15 and 16 will be retransmitted and so will line segments 29, 30, 31 and 32 etc. If the video data is transferred after a complete frame of data is generated, the frame can be reformatted to the described block format in the system memory. In this case, either the video accelerator chip 255, through direct memory access (DMA), or the processor may initiate the transfer.

Returning to FIG. 3, the pixel blocks such as those in FIG. 5 are transferred to the bilinear filter 360 either from the video input interface 330 or the color space converter 350. FIG. 7 depicts a block diagram of a bilinear filter used in the present invention for resizing video images. The bilinear filter of the invention consists of first-in first-out (FIFO) buffers 502 and 504 coupled to vertical filter 510. The vertical filter 510 is further coupled to buffer 520 which is also coupled to horizontal filter 530.

The bilinear filter stores the rows of pixels in the FIFOs 502 and 504. Each FIFO stores an adjacent row of eight pixels in one data block. For instance, row (a) in block 1 of FIG. 4 may be stored in FIFO 502 and row (b) stored in FIFO 504. After intermediate rows have been generated between rows (a) and (b), row (a) will be replaced by row (c) to allow for the generation of intermediate rows between rows (b) and (c). Row (c) will then be replaced by row (d) etc. until the processing of block 1 is complete. Block 2 will then be processed, then block 3 until the processing of strip I is complete. This process will continue for each frame of the video image data.

After the processing or generation of a row, it is transferred to buffer 520 for horizontal interpolation. As in the prior art's bilinear filter, the buffer 520 may be of two-pixel or three-pixel storage capacity. The horizontal filter 530 interpolates between the two oldest pixels in the buffer 520 in the manner described in the prior art. The oldest pixel in the buffer is then replaced by a new pixel and interpolated pixels are again generated between the two oldest pixels. This process continues until the horizontal block interpolation is complete. Thus at the video output, a resized image is produced by the bilinear filter.

The extra five-pixel storage capacity of FIFOs 502 and 504 is used for adjacent block filtering between every two blocks in a strip. returning to FIG. 5, suppose pixels $p_0$–$p_7$ make up row (a), pixels $p_8$–$p_{15}$ make up row (b), and pixels $p_{16}$–$p_{23}$ make up row (c) etc. of block 1, after block 1 is processed four of the five-pixel storage of FIFO 502 would contain $p_7$, $p_{23}$, $p_{39}$ and $p_{55}$ and four of the five-pixel storage of FIFO 504 would contain $p_{15}$, $p_{31}$, $p_{47}$ and $p_{63}$. When $p_{64}$, which is the first pixel of block 2 of strip I, is scanned into the FIFO 502, it is saved in the unused storage capacity of FIFO 502. At the appropriate time, Pixels $p_7$ and $p_{64}$ are provided to the horizontal filter 530 for horizontal interpolation. Similarly, pixels $p_{15}$ and $p_{77}$ in FIFO 504, $p_{23}$ and $p_{80}$ in FIFO 502, $p_{31}$ and $p_{88}$ in FIFO 504 etc. will be used for horizontal interpolation between blocks 1 and 2 of strip I. The last pixels of each row of block 2 will replace the pixels of block 1 in four of the five-pixel storage capacity of the FIFOs 502 and 504 for horizontal interpolation between blocks 2 and 3. This process will continue until each strip is entirely processed.

The present invention also supports cameras, VCRs or video codec machines which are used for the purpose of monitoring, authoring, or video conferencing applications. These devices represent real-time video sources and provide uncompressed output image data. Consequently, image data from these devices may be stored directly into the frame buffer 260 for processing by the video accelerator 255. If, however, the frame buffer 260 is not available, the system memory 210 may be used to store the data. When the data is stored in the main memory 210, it is transferred to the video accelerator 255 in block fashion. When the data is stored in the frame buffer 260, it is directly accessed by the video accelerator 255 for processing. In either case, the data will be available to the video accelerator 255 in block ordered image frame format.

As explained above, the bilinear filter of the present invention uses a FIFO system capable of storing 26 pixels. This storage capacity is much smaller than the 768-pixel storage of the memory system of the bilinear filter of the prior art. Hence, the video accelerator chip can be manufactured in much smaller packages and its cost minimized due to the lesser on-chip storage requirement.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A bilinear filter in a graphics adapter for resizing a video image, said video image being divided into M rows by M columns arrays of data elements, said bilinear filter comprising:

at least two first-in first-out (FIFO) memory devices having each a storage capacity equal to M data elements and an extra storage capacity to store data elements for interpolating between two adjacent M×M arrays, said devices for storing adjacent rows of said arrays; and means, connected to said first-in first-out memory devices, for vertically resizing said video image by interpolating between said rows.

2. The bilinear filter of claim 1 further comprising means, coupled to said vertically resizing means, for horizontally resizing said vertically resized image.

3. The bilinear filter of claim 2 wherein said vertically resizing means includes a first filter for generating intermediate rows between said stored rows.

4. The bilinear filter of claim 3 wherein said horizontal resizing means includes a second filter for generating intermediate pixels between stored pixels.

5. The bilinear filter of claim 4 further comprising a storage means between said vertical filter and said horizontal filter for storing said generated rows of pixel data.

6. A method of resizing a video image comprising the steps of:

dividing said image into M rows by M columns arrays of data elements;

storing adjacent rows in at least two first-in first-out (FIFO) memory devices having each a storage capacity equal to M number of data elements and storing data elements for interpolating between adjacent arrays of said video image in an extra storage of said at least two first-in first-out memory devices; and vertically resizing said video image by interpolating between said adjacent rows.

7. The method of claim 6 further comprising the step of horizontally resizing said vertically resized image.

8. The method of claim 7 wherein said step of vertically resizing includes generating intermediate rows between each two rows of said M×M arrays.

9. The method of claim 8 wherein said step of horizontal resizing includes generating intermediate horizontal pixels between each two pixels in a row.

10. The method of claim 9 further comprising the step of storing said generated intermediate rows in a storage means between said vertical filter and said horizontal filter.

11. A computer system for resizing a video image comprising:

a processor for processing said video image data to generate M rows by M columns of data elements and for transmitting said arrays of data;

a graphics adapter for receiving said arrays of data, said graphics adapter including a bilinear filter having:

at least two first-in first-out (FIFO) memory devices having each a storage capacity equal to M data elements and an extra storage capacity to store data elements for interpolating between two adjacent arrays of said video image, said devices for storing adjacent rows of said arrays; and means, connected to said first-in first-out memory devices, for vertically resizing said video image by interpolating between said adjacent rows.

12. The computer system of claim 11 wherein said bilinear filter further comprises means, coupled to said vertically resizing means, for horizontally resizing said vertically resized image.

13. The computer system of claim 12 wherein said vertically resizing means includes a first filter for generating intermediate rows between at least two stored rows.

14. The computer system of claim 13 wherein said horizontal resizing means included a second filter for generating intermediate columns.

15. The computer system of claim 14 wherein the bilinear filter further comprises a storage means between said vertical filter and said horizontal filter for storing said generated intermediate rows.

* * * * *